United States Patent [19]

Sullivan

[11] Patent Number: 4,896,250
[45] Date of Patent: Jan. 23, 1990

[54] SOLVENT-PROCESSIBLE ELECTRICALLY CONDUCTIVE COATINGS

[75] Inventor: Mary Sullivan, Marlboro, Mass.

[73] Assignee: Emerson & Cuming, Inc., Lexington, Mass.

[21] Appl. No.: 155,188

[22] Filed: Feb. 12, 1988

[51] Int. Cl.$^4$ .......................... H01G 9/00; H01B 1/02
[52] U.S. Cl. .................................. 361/523; 252/512
[58] Field of Search .............. 361/306, 308, 309, 310, 361/323, 433; 252/500, 510, 511, 503, 512, 514; 219/553; 524/440, 441, 609; 29/570.1; 427/79, 80, 96

[56] References Cited

U.S. PATENT DOCUMENTS

| | | | |
|---|---|---|---|
| 3,439,231 | 4/1969 | Booe | 361/433 S |
| 3,516,150 | 6/1970 | Leech | 361/306 X |
| 3,675,087 | 7/1972 | Zykov et al. | 29/570.1 X |
| 3,935,516 | 1/1976 | Petrikat | 29/570.1 X |
| 4,009,424 | 2/1977 | Itoh | 361/433 S |
| 4,042,632 | 8/1977 | Hofer et al. | 260/607 |
| 4,127,699 | 11/1978 | Aumiller et al. | 428/461 |
| 4,164,005 | 8/1979 | Cheseldine | 361/433 C |
| 4,264,477 | 4/1981 | Seeger et al. | 252/503 |
| 4,322,317 | 3/1982 | Rao et al. | 252/520 |
| 4,520,067 | 5/1985 | Harris et al. | 428/901 X |
| 4,546,010 | 10/1985 | Killer et al. | 427/96 |
| 4,582,872 | 4/1986 | Hudgin et al. | 524/441 X |
| 4,595,606 | 6/1986 | St. John et al. | 524/440 X |
| 4,596,670 | 6/1986 | Liu | 252/511 |
| 4,720,393 | 1/1988 | Bjorklund | 427/80 X |

FOREIGN PATENT DOCUMENTS

| | | |
|---|---|---|
| 1168859 | 6/1984 | Canada . |
| 32602 | 9/1956 | Fed. Rep. of Germany ...... 361/309 |
| 58-10815 | 1/1983 | Japan . |
| 1234954 | 6/1971 | United Kingdom . |
| 2124635A | 2/1984 | United Kingdom . |

OTHER PUBLICATIONS

Polyethersulfone & Polyarylsulfone, Modern Plastics Encyclopedia 1986–1987, pp. 101, 102.
Japan Abstracts vol. 11, No. 192 (C-429) (2639), Jun. 19, 1987.

Primary Examiner—Donald A. Griffin
Attorney, Agent, or Firm—William L. Baker; Kevin S. Lemack; Bart G. Newland

[57] ABSTRACT

Novel solvent processible electrically conductive coatings of conductive particle (e.g. silver) filled polysulfones. The coating compositions are useful in a variety of environments, especially in the manufacture of tantalum capacitors. The coatings advantageously are extremely heat stable to withstand high temperature soldering and attach to solder without thermal decomposition.

9 Claims, No Drawings

SOLVENT-PROCESSIBLE ELECTRICALLY CONDUCTIVE COATINGS

BACKGROUND OF THE INVENTION

The present invention relates to solvent-processible conductive coatings, and more particularly to electrically conductive coatings of electrically conductive particle filled polysulfones.

Electrically conductive coatings are widely used in the electronics, defense and aerospace industries in conjunction with metals and plastics for electrostatic discharge electroless plating applications, in EMI/RFI shielding and in solder attach applications. Solvent processible polymer systems currently employed in this field include thermoplastic acrylics and polyesters, and thermosetting epoxies and acrylics, all of which have well known limitations. The thermoplastic systems, when filled with electrically conductive particles, exhibit excellent conductivity and are readily processible at low cure temperatures and short cure times. Unfortunately, these systems often exhibit limited chemical and temperature resistance properties which restrict their use.

Electrically conductive coatings used in capacitor construction, as well as in some of the previously mentioned applications, must be capable of forming a sturdy bond to solder (i.e., they must be "solderable") with good electrical contact. Solderability occurs through conductive particle-to-solder contact. The standard thermoplastic solderable coatings are acrylic or polyester based and decompose or degrade when heated to the 185° to 250° C. temperatures of soldering. While this decomposition is necessary to allow the solder to attach directly to the conductive particle filler, the decomposition or degradation is unpredictable and can undesirably spread beyond the solder attach site. Such undesired decomposition or degradation usually diminishes the electrical properties of the coating and the function of the entire article.

The thermosetting epoxies and acrylics, when filled with conductive particles, show improved chemical and temperature resistance in many applications. Such compositions often require prohibitive time/temperature cure profiles, have limited useful life and do not exhibit appreciable solderability.

The present invention finds particular utility as one of the conductive layers of tantalum capacitors. The layers surrounding the tantalum core of such capacitors most frequently are created by dipping the core in a series of baths containing a material to be deposited in an appropriate solvent. Thus, this "solvent processibility" is quite important in this field of use for conductive coatings.

Accordingly, it is an object of the invention to provide solvent processible electrically conductive coatings.

Another object of the invention is to provide such conductive coatings which exhibit good adhesion to a variety of substrates, form a sturdy bond to solder and are stable when exposed to high temperatures, i.e., those encountered during soldering.

A further object of the invention is to provide such conductive coatings which exhibit excellent electrical properties.

SUMMARY OF THE INVENTION

The foregoing and other objects of the invention are attained by the present solvent processible electrically conductive particle filled polysulfone compositions.

Polysulfone materials are widely available. Their primary use has been as a solid plastic for injection-molded parts. Polysulfones have been combined with a variety of fillers, including glass and metal fillers in order to provide structural reinforcement and shielding effectiveness.

Polysulfones, being classified as "engineering thermoplastics", advantageously exhibit high thermal stability, excellent chemical resistance to aqueous mineral acids, alkali, salt solutions, oils and greases. While these properties make polysulfone-molded parts quite attractive for various uses, they also have lead to relatively little interest in their use in solvent processing applications.

As used herein, "polysulfone" means any polymer having repeating groups containing sulfone (O=S=O) groups i.e., polymers containing repeating groups of the general formula (I):

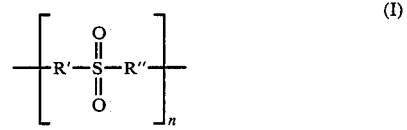

Any particular identities of R', R' and n are not required. A wide variety of polysulfones are available. For example, R' and R" independently can contain one or more groups selected from aryl, alkyl, alkaryl, aralkyl, phenoxy and sulfone among others. R' and R" independently can include internal ether linkages. Virtually all commercially useful polysulfones are of the above formula wherein both R' and R" contain aryl groups; these are the aromatic thermoplastic resins known for superior properties. Preferred polysulfones include ether linkages between repeating groups. The number of repeating units (n) varies among the various commercially available polymers. In general, useful polymers are of 10,000 to 50,000 (no. average) molecular weight.

The most preferred polysulfone is Victrex polyether sulfone (trademark of ICI) which is of the formula (II):

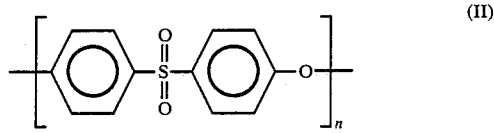

wherein n=about 95 and the molecular weight (no. average) is about 22,000. When those skilled in the art refer to "polyether sulfone", the above polymer of formula II often is intended. Other polysulfones exhibiting excellent physical properties, and included within the scope of the present invention, include Udel polysulfone (Union Carbide Corp), Astrel 360 polyarylsulfone (Carborundum Company), and Radel polyphenylsulfone (Union Carbide Corp.) all of which are referenced in *Kirk-Othmer Encyclopedia of Chemical Technology*, 3rd Edition, Vol. 18, page 833, as "four basic sulfone polymers".

The polysulfones are solids and thus must be placed into solution for further processing according to certain preferred embodiments of this invention. While the use of any particular solvent (or combination of solvents) is not required, the solvent should be compatible with the polysulfone such that the polysulfone dissolves and remains dissolved therein. Examples of useful solvents include N-methyl pyrrolidone, N-ethyl pyrrolidone, N-hydroxyethyl pyrrolidone, dimethyl formamide and butyrolactone.

As the polysulfones themselves are non-conducting, they must be filled with conductive particles. A "particle" as this term is used herein does not limit the geometry of the filler material and includes spherical, plate-like, fibrous and irregularly shaped particles and combinations thereof. The invention is not limited to the use of any specific conductive particle. Examples of conductive particles include those of silver, gold, platinum, copper, nickel, tin and other conductive elemental metals, and alloys or other combinations thereof, those of carbon, and those of non-conducting material having a conducting material coated thereon or filled therein such as silver-plated glass particles and nickel-plated mica particles. Average particle size of conductive particles typically ranges from a fraction of a micron to hundreds of microns in diameter; silver particles from 1 to 20 micron diameter, especially 5 to 8 microns, are especially preferred. The choice of the size, shape and content of the particles often depends on the final use for the conductive coating and is with the artisan's skill.

The compositions of the present invention which are capable of being coated onto a substrate include polysulfone resin, electrically conductive particles and suitable solvent. After application to a substrate, the solvent is driven off (preferably aided by the application of heat) to leave behind a solid coating of electrically conductive particle filled polysulfone. The lower and upper limits of the amount of electrically conductive filler in the composition is functionally defined: the lower limit being that which is sufficient to give the desired electrical conductivity and the upper limit being the critical pigment volume concentration above which the coating fails to maintain useful structural integrity. These lower and upper limits depend on the make-up of the conductive particles as well as their size and shape. Particular limits are readily determined by the artisan. In general, a solid coating containing at least about 50% by weight of electrically conductive particles, based on the total weight of the coating, is preferred. More preferred are coatings containing about 66 to 95% by weight of filler.

The compositions capable of forming a solid coating, i.e. the solvent-containing compositions, are prepared by first dissolving polysulfone resin in solvent. A solution containing about 15 to 25 weight % resin is preferred. Conductive particles are mixed into the polysulfone solution in an amount sufficient to provide the desired electrical properties, without exceeding the critical pigment volume concentration, in the solid coating. In general, 20 to 60 wt. %, preferably 30 to 50 wt. %, based on the weight of the solution is used. The desired final viscosity is obtained by adding additional solvent, preferably along with another volatile organic liquid such as toluene or xylene. For compositions used to dip-coat substrates, a final viscosity of 250 to 500 cps at 25° is preferred.

Silver filled polysulfone compositions according to preferred embodiments are prepared by dissolving 15 to 25 wt. Victrex 4800 G PES (I.C.I.) in 85 to 75 wt. % N-methyl pyrrolidone. As the PES is not easily dissolved, mixing is employed until a lump free consistent solution is obtained. Silver flake is mixed into the resulting PES solution at the preferred concentration of 30 to 50% by weight, based on the weight of the total. Mixing sufficient to thoroughly wet the silver is desired. Additional N-methyl pyrrolidone as well as toluene is added at this stage to provide the desired final viscosity.

The following example illustrates a specific embodiment of the present invention:

EXAMPLE ONE

A silver filled polyether sulfone solution is prepared by dissolving 25 pph (parts per hundred weight) polyether sulfone (Victrex 4800G, ICI) of formula (II) in 75 pph N-methyl pyrrolidone. As the polyether sulfone is not easily dissolved, the container is rolled for 48 to 72 hours until a lump free consistent solution results. 37.5 pph of the resulting PES solution, 5.4 pph N-methyl pyrrolidone and 10.8 pph toluene are combined in the bucket of a Ross double planetary mixer and mixed thoroughly. 30 pph Metz No. 9 silverflake (nominal 5 micron diameter) is gradually added to the mixture while stirring gently until the silver is thoroughly wet out. The mixture is degassed under vacuum and the viscosity is adjusted to the desired 300 to 350 cps (25° C. Brookfield No. 2, 100 rpm), by the addition of 6.3 pph N-methyl pyrrolidone and 10 pph toluene.

The resulting solution is used in the preparation of a solderable silver-containing layer of tantalum capacitors via a dip-coating process. The coating imparts to the capacitors excellent capacitance, low dissipation factor (DF) and low equivalent series resistance (ESR). Importantly, the values of these properties fall within a narrow range and are readily reproducible. While conventional acrylic coatings often result in capacitors which become less efficient (increased DF and/or ESR) after packaging (soldering), the use of the present inventive coatings provides capacitors which can exhibit increased efficiency after packaging and improved long-term high temperature stability.

In the following table capacitance (CAP) in picofarads and % DF, both measured at 1 kHz, is compared among tantalum capacitors employing conventional acrylic-based silver-filled coatings, thermoplastic epoxy-based silver-filled coatings and Victrex PES-based silver-filled coatings. The use of a thermoset epoxy-based coating failed as it was not solderable. Dilution, viscosity, silver-to-resin ratio and type of silver particles was constant to enable direct comparisons. The reported values were taken after silver coating and again after soldering.

| Coating | Coated | | Soldered | |
|---|---|---|---|---|
| | CAP | % DF | CAP | % DF |
| Acrylic | 237 | 7.7 | 233 | 8.48 |
| Epoxy | 236 | 8.31 | 228 | 8.7 |
| PES | 232 | 8.09 | 223 | 6.7 |

As seen in the data above, tantalum capacitors containing silver-filled coatings of the present invention exhibited marked improvement in both capacitance and DF when compared to known materials.

Although the invention has just been described in connection with a preferred embodiment, it is not so limited. Modifications within the spirit and scope of the claims will be apparent to those skilled in the art.

I claim:

1. An article comprising a substrate and a layer thereon, said layer comprising (1) a coating comprising conductive particle filled polysulfone, and (2) solder on said conductive particle filled polysulfone of said coating.

2. An article of claim 1 wherein said conductive particles comprise silver.

3. An article of claim 1 wherein said conductive particles are selected from the group consisting of conductive elemental metal, carbon, and nonconducting particles having a conductive material coated thereon or filled therein.

4. An article of claim 1 wherein said polysulfone is of formula

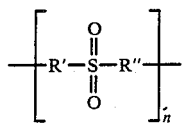
(I)

wherein R' and R" independently include one or more groups selected from alkyl, aryl, aralkyl, alkaryl, alkoxy, phenoxy and sulfonyl and wherein n is such that the number average molecular weight is about 10,000 to 50,000.

5. An article of claim 1 wherein said polysulfone is of formula

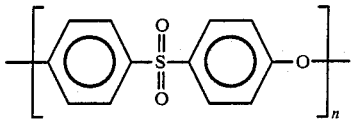
(II)

wherein n is about 95.

6. An article of claim 5 wherein said conductive particles comprise silver.

7. An article of claim 1 wherein said substrate comprises tantalum.

8. A composition capable of being coated onto a substrate and comprising silver, polysulfone of the formula:

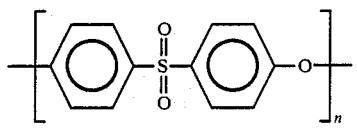

wherein n is about 95, and pyrrolidone solvent for the polysulfone.

9. A composition according to claim 8 wherein said pyrrolidone solvent is N-methyl pyrrolidone.

* * * * *